United States Patent Office 3,364,251
Patented Jan. 16, 1968

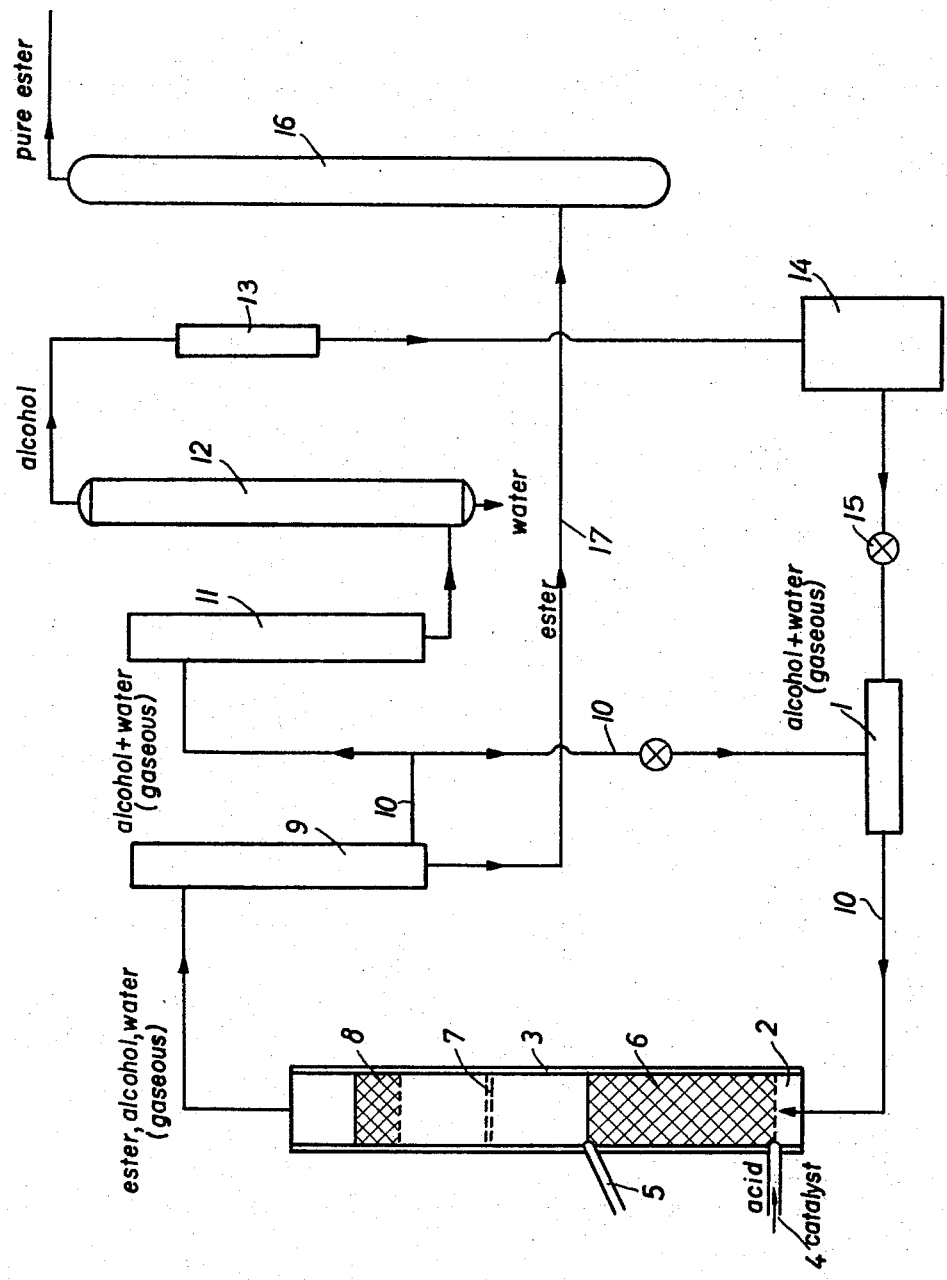

3,364,251
PROCESS FOR THE PRODUCTION OF CARBOXYLIC ACID ESTERS IN THE PRESENCE OF A FLUIDIZED CATALYST BED
Anton Benning and Rudolf Novotny, Essen-Heisingen, Germany, assignors to Bergwerksverband G.m.b.H., Essen, Germany, a corporation of Germany
Continuation of application Ser. No. 191,663, Apr. 19, 1962. This application Oct. 17, 1966, Ser. No. 587,349
Claims priority, application Germany, Nov. 17, 1958, B 51,101
18 Claims. (Cl. 260—475)

ABSTRACT OF THE DISCLOSURE

A $C_4$ to $C_{14}$ carboxylic acid is esterified by contacting the acid in the solid state with a $C_1$ to $C_{12}$ alcohol and with solid particles of catalyst fluidized by means of a carrier gas, the esterification temperature being sufficient to produce the ester in the vapor phase while leaving the acid in a solid state. The ester is removed in the vapor phase from the fluidized bed. A typical example is the production of a terephthalic acid diester from solid terephthalic acid and isobutyl alcohol, using a powdered silica catalyst at a temperature of 280–300° C. (Example 1).

---

This application is a continuation of Ser. No. 191,663, filed Apr. 19, 1962, now abandoned, which is a continuation-in-part of Ser. No. 853,607, filed Nov. 17, 1959, now abandoned.

Our present invention relates to a process for the production of carboxylic acid esters wherein a carboxylic acid and an alcohol are brought into contact with a fluidized bed of finely divided, solid particles of an esterification catalyst at a reaction temperature at which the carboxylic acid is in solid state and at which the resultant ester is in the vapor phase. More particularly, it concerns such a process wherein terephthalic acid and methanol are continuously converted to the dimethyl ester of terephthalic acid in one or more stages, and the diester form is separated from the effluent vapors by condensation.

It is known to esterify carboxylic acids in closed autoclaves at temperatures between 100° and 350° C. with the aid of esterification catalysts. More recently it has been determined that such an esterification under pressure may also be effected without the use of catalysts. Such processes operating at superatmospheric pressures are subject to a number of disadvantages. Due to the extended reaction periods required they must be conducted batchwise rather than continuously. The yields are unsatisfactory since thermal decomposition of the esters formed is unavoidable during their long reaction periods. Furthermore, the use of catalysts in these procedures requires a special purification of the final products. One frequently obtains complex reaction mixtures, for example in the esterification of terephthalic acid the resultant diester will contain unconverted terephthalic acid besides the monoester due to the insolubility of the terephthalic acid.

It is also known to pass a mixture of the vapors of an acid and an alcohol through a tube filled with a catalyst. Since the reaction temperature is above the boiling point of the acid, the reaction temperature is relatively high and causes some decomposition of the vaporized acids and the formed esters; thus aromatic dicarboxylic acids are partially decarboxylated and yield esters of monocarboxylic acids. If, for instance, a mixture consisting of vapors of terephthalic acid and methanol is passed over thorium oxide, the formed ester has an acid number as high as about 170.

We have now found that one can obtain carboxylic acid esters continuously with a high throughput and nearly theoretical yield in a particularly pure form having acid numbers close to the theoretical ones, if one contacts a carboxylic acid and an alcohol with a fluidized bed of finely divided, solid particles of an esterification catalyst fluidized by means of a carrier gas at a temperature at which the ester produced is in the vapor phase and at which the acid is still in the solid state. The effluent vapors may be partly condensed to separate the resultant esters or they may be fully condensed and separated into their components by distillation. The carrier gas which may consist of excess vaporized alcohol and other unreacted materials can readily be recycled.

Our process is applicable to esterification of all carboxylic acids which are solids at a reaction temperature at which the resulting esters are in vaporous state.

We have discovered that in our process the esterification of the carboxylic acids and alcohols takes place most rapidly so that the carboxylic acids may be smoothly converted into the desired esters within the brief residence periods required in a continuously operated fluidized bed process. Surprisingly a complete esterification can be attained with average residence times of the esters formed in the fluidized bed of from about $\frac{1}{100}$ to about 5 seconds. These residence times correspond to a total residence time of the volatile reaction participants, especially of the esters formed, within the entire esterification vessel not exceeding about 60 seconds.

The process of our invention may be conducted at superatmospheric pressures or at subatmospheric pressures. However, we prefer to operate under atmospheric pressure applying only such pressure differentials as are needed to assure the desired rapid throughput of gases. The most important advantages of our invention may be enumerated as follows:

(1) The process is continuously operated with a high throughput, for example, when esterifying terephthalic acid, from about 1500 to about 2400 g. of ester is produced per liter of catalyst per hour.

(2) A subsequent separation of the catalysts is not required since they are left in the fluidized bed while the esters are removed in the vapor phase, thus minimizing contamination thereof.

(3) The very short residence times of the reactants and reaction products at the reaction temperatures minimize thermal decomposition.

(4) The process may be operated at atmospheric pressure.

(5) The process can be conducted in a simple apparatus of relatively small size.

(6) The removal of the esters formed in the vapor phase (by sublimation if need be) from the reaction stage generally has a purifying effect.

Further advantages resulting from our invention, particularly when applied to specific reactants under special conditions, will become apparent as the description thereof proceeds.

The carboxylic acids that may be esterified in accordance with our invention include aliphatic, aromatic, and heterocyclic mono- and polycarboxylic acids, as well as the partially esterified polycarboxylic acids. Aromatic polycarboxylic acids such as terephthalic acid, phthalic acid, dimethyl isophthalic acid, and pyromellitic acid are esterified with particular advantages by our method. Among the suitable aliphatic mono- and polycarboxylic acids there may be mentioned, for example succinic acid and adipic acid. However, further aromatic carboxylic acids such as naphthalene carboxylic acids may also be used. Finally, one may employ heterocyclic acids such as nicotinic acid. The preferred acids contain from 4 to 14 carbon atoms.

On the other hand, all those alcohols may be used as starting materials, which will react with the various carboxylic acids to be esterified and give esters that are volatile at the reaction temperatures. Generally we prefer to employ alcohols having from 1 to 12 carbon atoms. These include lower aliphatic alcohols such as methyl, ethyl, propyl, butyl, and isobutyl alcohols, as well as the higher ones up to dodecyl alcohols. The process of our invention is, however, also applicable to araliphatic alcohols such as benzyl alcohol and cinnamic alcohol.

The fluidized bed in which the reaction proceeds in accordance with our invention is composed of known esterification catalysts. Such suitable catalysts include the oxides, hydroxides, borates, silicates, and phosphates of the elements of main groups I to IV and all of the subgroups of the Periodic Table, such as sodium silicates, hydrohalic acids, especially hydrochloric acid, copper phosphate, calcium phosphate, zinc oxide, zinc chloride and zinc borate, alumina, aluminium phosphate and aluminium borate, boron phosphate, chromium phosphate, vanadium phosphate, manganese phosphate and iron phosphate, and iron silicate. All of these compounds may be deposited on a carrier material. A particularly suitable catalyst is silica, especially in the form of silica gel.

The yields to be achieved with the foregoing catalysts are always nearly theoretical ones. But the throughput, that is the number of parts by weight of ester produced per liter of catalyst per hour, is by far the best when employing the silica gel catalyst. It is, therefore, believed that the silica gel is not only efficient simply as a catalyst but also that it may participate in the reaction. The mechanism of such reaction may be the following:

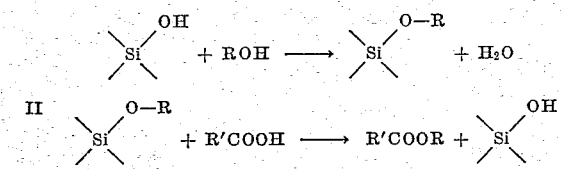

It is remarkable that this reaction is a reaction between two solids, which is known to those skilled in the art as the solid/solid reaction. It must be supposed that similar reactions take place with the other catalysts, but the reaction with the silica seems to have the shortest reaction time of these solid/solid conversions.

The esterification catalysts are fluidized in a conventional manner by means of a carrier gas to form a fluidized catalyst bed. Suitable carrier gases include, for example nitrogen or carbon dioxide. However, the vaporized alcohol to be esterified or mixtures thereof with inert gases are used with particular advantage as the carrier gases. It is remarkable that alcohols may be used which contain as much as 60% by volume and more of water without substantially affecting thereby the course of the reaction. The carrier gases, especially the excess alcohols, are recycled into the fluidized bed after having been completely or partially freed from the completely or partially esterified products.

To facilitate the fluidization of the solids in forming the fluidized catalyst bed, it is preferable to use esterification catalysts of relatively small particle size. The particle size may range between 0.05 and 10 millimeters, preferably between 0.05 and 0.2 mm., i.e. between 50 and 200 microns. On the other hand, the flow velocity of the fluidizing gas is dependent upon the height of the bed which is advantageously at least 10 centimeters and preferably from .20 to 200 cm. high. With these bed heights, the flow velocity of the fluidizing gas ranges between 0.05 and 5 meters per second and preferably between 0.1 and 1 meter per second depending upon the particle size and the specific gravity of the catalysts employed.

It is unimportant to the course of the reaction in what state of aggregation the alcohols are introduced into the fluidized catalyst bed, if the fluidization of the solids is effected by means of inert gases. In case it is desired to fluidize the esterification catalysts with the alcohol itself, the latter must first be converted into the vapor phase, and the fluidized bed temperature must be maintained sufficiently high so that not only the ester being produced but also the alcohol are maintained in the vapor phase. The temperature should range several degrees above the boiling point of the alcohol or at a level at which the partial pressure of the alcohol in the vapor mixture is high enough to achieve a maximum esterification rate. On the other hand, it is a very important feature of the invention that the reaction proceeds at a temperature at which the acid is solid; this means that the acid must form a part of the solid, fluidized bed. This has the advantage that practically no unreacted acid leaves the reactor. A second advantage is the fact that the selected reaction temperatures are relatively low, so that no decomposition of the acids or the esters formed takes place. Of course, the selected temperature must be high enough to achieve a reasonable reaction time. In general, temperatures of between about 80° and about 340° C. and preferably between 150° and 320° C. are suitable.

Since the acid is introduced into the fluidized bed in the form of a pulverized solid, it is preferable to arrange a filter downstream of the fluidized bed to prevent unconverted acid from being entrained by the mixture of carrier gas and ester.

In general, the alcohol is used in excess of the amount required for the esterification, especially in those cases where the alcohol is used as a carrier gas for fluidizing the solids forming the fluidized bed. In such cases the alcohol and the carboxylic acid are normally used in a molar ratio of at least 1:1 and more up to 50:1. The excess alcohol is easily freed from the ester produced by cooling and is recycled into the fluidized bed after replenishment with fresh alcohol.

The throughput of the alcohols and carboxylic acids is, of course, dependent upon the size of the apparatus. Since the residence times of the reaction components can be kept unusually short, high throughput rates are obtained with relatively small units of apparatus.

The process of our invention will now be explained in greater detail with reference to the appended schematic drawing of a suitable apparatus using the esterification of terephthalic acid with methanol for purpose of illustration.

Methanol vapors from a superheater 1 are introduced upwardly through a bubble tray 2 into a fluidized bed reactor 3 which is heated at 200–300° C. At the same time, finely divided terephthalic acid is passed through a conduit 4 and into the fluidized bed reactor at the same rate as it is consumed in the reaction space by conversion into its dimethyl ester. A take-off device 5 permits withdrawal of spent catalyst from a fluidized catalyst bed 6. Fresh catalyst is introduced into the fluidized bed as required, the addition being likewise effected via the conduit.

The vaporized alcohol flows through the fluidized catalyst bed and reacts with the acid to form the desired diester. This diester, excess methanol and steam (reaction water) then pass upwardly through a separator 7 which retains entrained catalyst or unreacted terephthalic acid particles, through a further stationary catalyst bed 8 located downstream of said separator to assure complete esterification of the raw ester and into a condenser 9 where the diester is separated by fractional condensation. Part of the remaining methanol-water mixture is recycled into the fluid bed reactor through a pipe 10, the balance being condensed in a condenser 11 and rectified in a column 12 to separate the water. The anhydrous methanol is condensed in a cooler 13 and stored in a tank 14 from which the consumed amount of alcohol is pumped into the methanol cycle by a metering pump 15. The dimethyl ester is passed to a tower 16 through a pipe 17 for repeated purification by distillation.

In the fractional condensation effected in the condenser 9 minor impurities of acid esters may be removed separately and returned into the fluidized bed reactor 3 through the conduit 4, after mixing them with fresh acid. Such a fractionation of ester products quite generally results in ester fractions of highest purity.

Before the reactor is heated up, it is charged with 100 parts by weight of a silica catalyst of 50 to 200 microns particle size to which are admixed 33 parts by weight of finely powdered terephthalic acid. Upon heating up to 280° C., the catalyst material is caused to fluidize by means of vaporized methanol introduced from below at a sufficiently high flow velocity. At the same time 10 parts by weight per hour of powdered terephthalic acid and 0.05 part by weight per hour of the finely divided catalyst are added. 11.6 parts by weight per hour of diester are condensed in the condenser 9 from the effluent vapors. The resultant diester has an acid number of 7.2.

Our invention is further illustrated by the following examples, but they are not intended to limit it thereto.

*Example 1*

100 parts by weight of a silica catalyst of 50–200 microns particle size admixed with 100 parts by weight of terephthalic acid of the same particle size are charged into the fluidized bed reactor. After heating up the reactor to 280–300° C., fluidization of the catalyst-acid mixture is caused by introducing 156 parts by weight of superheated vapors of isobutyl alcohol per hour. During the reaction 14 parts by weight per hour of the terephthalic acid and 0.05 part by weight per hour of the catalyst are added to the reactor by means of a metering device. In the same period 25 parts by weight per hour of terephthalic acid diisobutyl ester are condensed in the condenser from the effluent vapors. The resultant ester has an acid number of 0.6 and a melting point of 54–55° C.

When substituting 420 parts by weight per hour of methanol for the isobutyl alcohol, the same catalyst attains a conversion of 210 parts by weight per hour of terephthalic acid dimethyl ester corresponding to a catalyst efficiency of 1720 grams of ester per liter of catalyst per hour. The acid number of the resultant ester is 6.4.

*Example 2*

100 parts by weight of an alumina catalyst of 50–200 microns particle size admixed with 33 parts by weight of pyromellitic acid of the same particle size are charged into the fluidized bed reactor. After heating up the reactor to 280–320° C., fluidization of the catalyst-acid mixture is caused by introducing preheated nitrogen. During the reaction, 28 parts by weight per hour of pyromellitic acid and 0.05 part by weight per hour of the catalyst are continuously introduced into the reactor by means of a suitable metering device. At the same time methanol at a rate of 32 parts by weight per hour is introduced through a second inlet provided at the base of the fluidized bed. During the reaction, 35 parts by weight per hour of the tetramethyl ester of pyromellitic acid are condensed in the condenser from the effluent vapors corresponding to a catalyst efficiency of 382 g. of ester per liter of catalyst per hour. This ester has an acid number of 1.8.

*Example 3*

In the manner described in Example 1, 74 parts by weight of dimethyl isophthalic acid are hourly reacted with 288 parts by weight of vaporized methanol at 270° C. 85 parts by weight per hour of the dimethyl ester of dimethyl isophthalic acid are condensed from the effluent vapors. The acid number of the ester produced is 8.2.

*Example 4*

Before being heated up, the fluidized bed reactor is charged with 100 parts by weight of a catalyst (about 70% $SiO_2$, 30% $H_2O$) made up of silica admixed with 33 parts by weight of adipic acid. Similarly to Example 1, 25 parts by weight of adipic acid are hourly reacted with 115.2 parts by weight of vaporized methanol at 145° C. 30 parts by weight per hour of dimethyl adipate are condensed in the condenser from the effluent vapors corresponding to a catalyst efficiency of 304 g. of ester per liter of catalyst per hour. The acid number of the product is 4.2, its melting point 0° C. and its boiling point 110.5° C. at 12 mm. Hg.

*Example 5*

100 parts by weight of a silica gel of less than 200 microns particle size are charged into a fluidized bed reactor and heated to a temperature of 280–320° C. Fluidization of the mixture is caused by introducing 428 parts by weight per hour of superheated methanol vapors and 192 parts by weight per hour of nitrogen. Terephthalic acid monomethyl ester is added to the reactor at a rate of 180 parts by weight per hour. During the reaction 193 parts by weight per hour of terephthalic acid dimethyl ester having an acid number of 0.8 are condensed from the effluent vapors.

*Example 6*

100 parts by weight of a powdered silica catalyst admixed with 33 parts by weight of powdered adipic acid are charged into the fluidized bed reactor. After heating up the reactor to 145° C., fluidization of the catalyst-acid mixture is caused by introducing 76.4 parts by weight per hour of methanol vapors superheated to 150° C. and HCl gas having a partial pressure pHCl of 25 mm. During the reaction, 39 parts by weight per hour of adipic acid are added to the reactor by means of a metering device. 46 parts by weight per hour of dimethyl adipate are condensed in the condenser from the effluent vapors corresponding to a catalyst efficiency of 464 g. of ester per liter of catalyst per hour. The acid number of the product is 5.1, its melting point 0° C.

*Example 7*

By the procedure described in Example 1, 36 parts by weight of nicotinic acid are hourly reacted at 200° C. with 57 parts by weight of vaporized methanol and 40 parts by weight per hour of the methyl ester of nicotinic acid are condensed from the effluent vapors corresponding to a catalyst efficiency of 400 g. of ester per liter of catalyst per hour. The ester has an acid numebr of 0.0 and a melting point of 38° C.

We claim:

1. A process for the production of a carboxylic acid ester which comprises contacting (1) an organic acid of 4 to 14 carbon atoms selected from the group consisting of a benzene polycarboxylic acid, a naphthalene polycarboxylic acid, a pyridine carboxylic acid, a saturated unsubstituted aliphatic polycarboxylic acid, and partial esters of the aforesaid polycarboxylic acids and (2) an alcohol of 1 to 12 carbon atoms selected from the group consisting of unsubstituted aliphatic and araliphatic alcohols, with a fluidized bed of finely divided solid particles of an esterification catalyst fluidized by means of a carrier gas at a temperature at which the ester produced is in the vapor phase and at which the acid is still in the solid state, and removing the ester vapors from the fluidized bed after an average residence time therein of from 1/100 to about 5 seconds.

2. A process for the production of an aromatic polycarboxylic acid ester which comprises passing vapors of an alcohol of 1 to 12 carbon atoms selected from the group consisting of unsubstituted aliphatic and araliphatic alcohols upwardly through a fluidized bed composed of finely divided solid particles of an esterification catalyst and of an aromatic polycarboxylic acid selected from the group consisting of a benzene polycarboxylic acid and a naphthalene polycarboxylic acid at a temperature at which the ester produced is in the vapor phase and at which the acid is still in the solid state, and removing the ester vapors from the fluidized bed after an average residence time therein of from 0.01 to about 5 seconds.

3. The process of claim 2 wherein said acid is a benzene polycarboxylic acid.

4. The process of claim 2 wherein said acid is a naphthalene polycarboxylic acid.

5. The process of claim 2 wherein said ester is the diester.

6. The process of claim 2 wherein the alcohol is a lower aliphatic alcohol.

7. A process for the production of terephthalic acid diesters which comprises passing vapors of a lower aliphatic alcohol upwardly through a fluidized bed composed of finely divided solid particles of an esterification catalyst and of terephthalic acid at a temperature at which the ester produced is in the vapor phase and at which the acid is still in the solid state, and removing the ester vapors from the fluidized bed after an average residence time therein of from 0.01 to about 5 seconds.

8. A process as claimed in claim 7, wherein the reaction temperature lies between about 80 and about 340° C.

9. A process as claimed in claim 7, wherein the particle size of the esterification catalyst and of the ester lies between about 50 and about 200 microns.

10. A process as claimed in claim 7, wherein the lower aliphatic alcohol used contains up to 60% by volume of water.

11. A process for the production of terephthalic acid diesters which comprises contacting finely divided solid terephthalic acid and an alcohol having from 1 to 12 carbon atoms with a fluidized bed of finely divided, solid particles of an esterification catalyst fluidized by means of an upward current of a carrier gas comprising the alcohol in vaporized form, at an esterification temperature between 80° and 340° C. sufficiently high to vaporize the raw ester so produced, then passing the effluent vapors through a further bed of solid particles of an esterification catalyst at about the same temperature whereby the esterification of the raw ester is substantially completed, and removing the ester vapors from the fluidized bed after an average residence time therein of from about 0.01 to about 5 seconds.

12. A process as claimed in claim 7 wherein finely divided solid particles of terephthalic acid are supplied to the fluidized bed from below as they are consumed therein, and finely divided solid particles of the esterification catalyst are likewise supplied as spent catalyst is withdrawn from the top portion of the fluidized bed.

13. A process as claimed in claim 7 wherein the esterification catalyst is silica gel.

14. A process for the production of a terephthalic acid diester which comprises contacting terephthalic acid and an alcohol having from 1 to 12 carbon atoms with a fluidized bed of finely divided solid particles of an esterification catalyst fluidized by means of an upwardly flowing carrier gas, at a temperature at which the ester produced is in the vapor phase and at which the acid is still in the solid state, and removing the ester vapors from the fluidized bed after an average residence time therein of from about $1/100$ to about 5 seconds.

15. The process of claim 14 wherein the carrier gas is composed essentially of vaporized alcohol used for the esterification.

16. The process of claim 14 wherein the esterification catalyst is silica.

17. The process of claim 14 wherein the solid acid used is in the form of finely divided particles which form part of the fluidized bed.

18. The process of claim 14 wherein finely divided solid particles of terephthalic acid are supplied to the fluidized bed from below as the acid is consumed in the reaction.

No references cited.

LORRAINE A. WEINBERGER, *Primary Examiner.*

T. L. GALLOWAY, *Assistant Examiner.*